(12) United States Patent
Saito et al.

(10) Patent No.: US 10,766,588 B2
(45) Date of Patent: Sep. 8, 2020

(54) OUTBOARD MOTOR RAISING/LOWERING DEVICE

(71) Applicant: SHOWA CORPORATION, Saitama (JP)

(72) Inventors: Takahiko Saito, Shizuoka (JP); Yoshimitsu Komuro, Shizuoka (JP)

(73) Assignee: SHOWA CORPORATION, Saitama (JP)

( * ) Notice: Subject to any disclaimer, the term of this patent is extended or adjusted under 35 U.S.C. 154(b) by 0 days.

(21) Appl. No.: 16/274,942

(22) Filed: Feb. 13, 2019

(65) Prior Publication Data

US 2019/0176949 A1 Jun. 13, 2019

Related U.S. Application Data

(63) Continuation of application No. PCT/JP2017/011178, filed on Mar. 21, 2017.

(30) Foreign Application Priority Data

Sep. 30, 2016 (JP) .................................. 2016-194890

(51) Int. Cl.
*B63H 20/10* (2006.01)
*B63H 20/00* (2006.01)
*B63H 20/14* (2006.01)

(52) U.S. Cl.
CPC ........... *B63H 20/10* (2013.01); *B63H 20/001* (2013.01); *B63H 20/14* (2013.01)

(58) Field of Classification Search
CPC ........ B63H 20/00; B63H 20/06; B63H 20/08; B63H 20/10; B63H 20/12; B63H 21/00;
(Continued)

(56) References Cited

U.S. PATENT DOCUMENTS 3,722,455 A 3/1973 Carpenter
3,839,986 A 10/1974 Meyer
(Continued)

FOREIGN PATENT DOCUMENTS

JP 58-028159 6/1983
JP 60-234096 11/1985
(Continued)

OTHER PUBLICATIONS

Allowance for JP 2017-145831, dated Feb. 6, 2018, 4 pages.
(Continued)

*Primary Examiner* — Lars A Olson
(74) *Attorney, Agent, or Firm* — Casimir Jones, SC; Robert A. Goetz

(57) ABSTRACT

Provided is an outboard motor raising and lowering apparatus that is capable of automatically changing the speed of raising/lowering of an outboard motor according to the status of the outboard motor. An outboard motor raising and lowering apparatus (1) includes: a first fluid passage that connects a pump (42) and a lower chamber(s) of one or more tilt cylinders (14); a second fluid passage that connects the first fluid passage and a lower chamber(s) of one or more trim cylinders (12); a switching valve (60) provided at the second fluid passage; and a control section (100) configured to control the switching valve (60) with reference to a watercraft status signal.

6 Claims, 6 Drawing Sheets

(58) Field of Classification Search
CPC ........ B63H 21/21; B63H 21/22; B63H 21/26; B63H 20/001; B63H 20/02; B63H 20/14; F15B 11/00; F15B 11/16; F02M 33/00; F02M 33/02; F02M 51/00; F02D 41/00
USPC .............................................. 440/61 F, 61 T
See application file for complete search history.

(56) References Cited

U.S. PATENT DOCUMENTS

| | | | |
|---|---|---|---|
| 4,391,592 | A | 7/1983 | Hundertmark |
| 4,557,696 | A | 12/1985 | Nakahama |
| 4,786,263 | A | 11/1988 | Burmeister |
| 4,909,766 | A | 3/1990 | Taguchi |
| 5,032,094 | A | 7/1991 | Katogi |
| 5,067,919 | A | 11/1991 | Okita |
| 5,215,484 | A | 6/1993 | Saito |
| 5,358,436 | A | 10/1994 | Soda |
| 5,444,979 | A | 8/1995 | Funami |
| 5,447,456 | A | 9/1995 | Nakayasu |
| 6,048,235 | A | 4/2000 | Kai |
| 6,139,380 | A | 10/2000 | Uematsu |
| 6,276,976 | B1 | 8/2001 | Saito |
| 6,296,535 | B1 | 10/2001 | Bland |
| 6,309,265 | B1 | 10/2001 | Oguma |
| 6,461,205 | B1 | 10/2002 | Banba |
| 6,837,761 | B2 | 1/2005 | Saito |
| 6,948,988 | B2 | 9/2005 | Okabe |
| 7,407,420 | B2 | 8/2008 | Fetchko |
| 8,025,006 | B2 | 9/2011 | Baros |
| 8,046,122 | B1 | 10/2011 | Barta et al. |
| 8,435,088 | B2 | 5/2013 | Morettin |
| 8,840,439 | B1 | 9/2014 | Wiatrowski |
| 8,851,944 | B1 | 10/2014 | Wiatrowski |
| 9,290,252 | B1 * | 3/2016 | Tuchscherer .......... B63H 20/08 |

FOREIGN PATENT DOCUMENTS

| | | |
|---|---|---|
| JP | 62-83298 | 4/1987 |
| JP | 64-28095 | 1/1989 |
| JP | 2-99494 | 4/1990 |
| JP | 2-102892 | 4/1990 |
| JP | 4-163292 | 6/1992 |
| JP | 4-368295 | 12/1992 |
| JP | 8-270608 | 10/1996 |
| JP | 9-11987 | 1/1997 |

OTHER PUBLICATIONS

Office Action for JP 2017-145831, dated Oct. 31, 2017, 9 pages.
English translation of International preliminary report on patentability of PCT/JP2017/033689, dated Aug. 8, 2019, 10 pages.
International Search Report for PCT/JP2017/033689, dated Nov. 7, 2017, 2 pages.
English translation of International preliminary report on patentability of PCT/JP2017/033688, dated Aug. 8, 2019, 13 pages.
International Search Report for PCT/JP2017/033688, dated Nov. 7, 2017, 2 pages.
Allowance for JP2017-145830, dated Feb. 6, 2018, 5 pages.
Office Action for JP2017-145830, dated Oct. 31, 2017, 13 pages.
Office Action for JP2017-014482, dated May 30, 2017, 9 pages.
Office Action for JP Patent Application No. JP2016-194890, dated May 30, 2017, 7 pages.
International Search Report of PCT/JP2017/011178, dated Jun. 6, 2017, 2 pages.
International preliminary report on patentability of PCT/JP2017/011178, dated Apr. 4, 2019, 5 pages.
Office Action for U.S. Appl. No. 16/438,096, dated May 11, 2020.
Office Action for U.S. Appl. No. 16/438,051, dated Jul. 14, 2020.

* cited by examiner

| SIG_IN | SIG_UD | SWITCHING VALVE |
| --- | --- | --- |
| ENGINE IS ON OR IN-GEAR | UP | OPEN |
| | DOWN | OPEN |
| | HOLD | OPEN |
| ENGINE IS OFF OR OUT-OF-GEAR | UP | CLOSE |
| | DOWN | OPEN |
| | HOLD | CLOSE |

OUTBOARD MOTOR RAISING/LOWERING DEVICE

TECHNICAL FIELD

An embodiment of the present invention relates to an outboard motor raising and lowering apparatus for raising and lowering an outboard motor provided to a hull.

BACKGROUND ART

In the field of watercrafts, outboard motor raising and lowering apparatuses have been known, which include: a tilt cylinder(s) used mainly to raise an outboard motor out of the water and lower the outboard motor into the water; and a trim cylinder(s) used mainly to change the angle of the outboard motor underwater (for example, Patent Literature 1 and 2).

CITATION LIST

Patent Literature

[Patent Literature 1]
Japanese Examined Patent Application Publication, Tokukosho, No. 58-028159 (Publication date: Jun. 14, 1983)
[Patent Literature 2]
Japanese Patent Application Publication, Tokukaihei, No. 2-99494 (Publication date: Apr. 11, 1990)

SUMMARY OF INVENTION

Technical Problem

Incidentally, an outboard motor raising and lowering apparatus is preferably capable of automatically changing the speed of raising/lowering of the outboard motor.

An object of an embodiment of the present invention is to provide an outboard motor raising and lowering apparatus that is capable of automatically changing the speed of raising/lowering of an outboard motor.

Solution to Problem

In order to attain the above object, an embodiment of the present invention is directed to an outboard motor raising and lowering apparatus configured to raise and lower an outboard motor, the outboard motor raising and lowering apparatus including: one or more tilt cylinders; one or more trim cylinders; a hydraulic pressure source; a first fluid passage that connects the hydraulic pressure source and a lower chamber(s) of the one or more tilt cylinders; a second fluid passage that connects the first fluid passage and a lower chamber(s) of the one or more trim cylinders; a switching valve provided at the second fluid passage; and a control section configured to control the switching valve with reference to a watercraft status signal.

Advantageous Effects of Invention

According to an embodiment of the present invention, it is possible to automatically change the speed of raising/lowering of an outboard motor.

DESCRIPTION OF EMBODIMENTS

Embodiment 1

The following description will discuss an outboard motor raising and lowering apparatus 1 in accordance with Embodiment 1 of the present invention, with reference to FIGS. 1 to 6.

Figure 1:
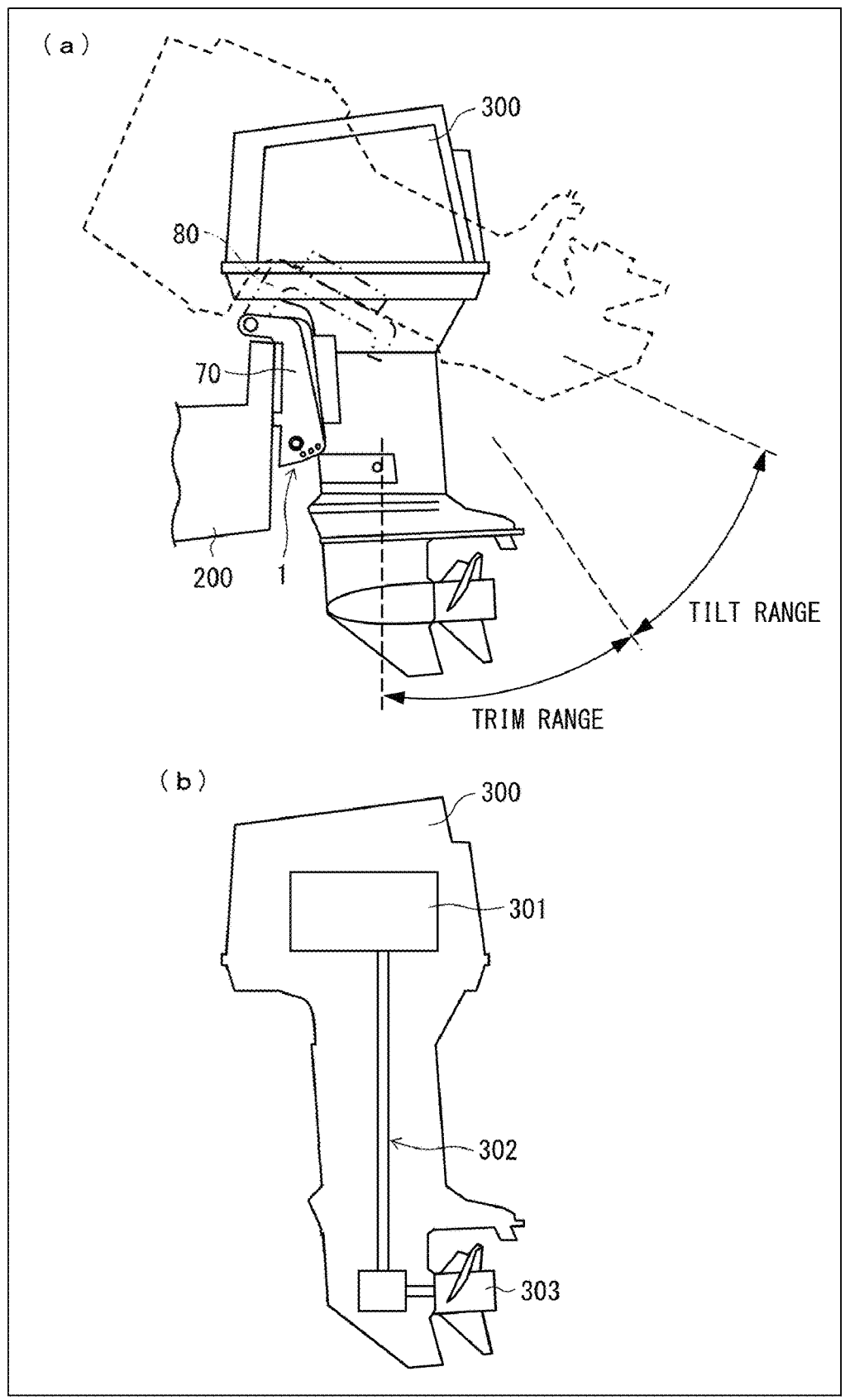
FIG. 1 illustrates an example of use of an outboard motor raising and lowering apparatus in accordance with Embodiment 1, and schematically illustrates an internal structure of an outboard motor.

The outboard motor raising and lowering apparatus 1 is an apparatus that serves to raise and lower an outboard motor 300. (a) of FIG. 1 illustrates an example of use of the outboard motor raising and lowering apparatus 1, in which the outboard motor raising and lowering apparatus 1 is attached to the stern of a hull (main part) 200 and to the outboard motor 300. The solid line in (a) of FIG. 1 represents the outboard motor 300 in its lowered position, whereas the dashed line in (a) of FIG. 1 represents the outboard motor 300 in its raised position. (b) of FIG. 1 schematically illustrates an internal structure of the outboard motor 300. As illustrated in (b) of FIG. 1, the outboard motor 300 includes: an engine 301; a propeller 303; and a power transmission mechanism 302 that transmits power from the engine 301 to the propeller 303. The power transmission mechanism in this arrangement is constituted by, for example, a shaft and gears.

Figure 2:
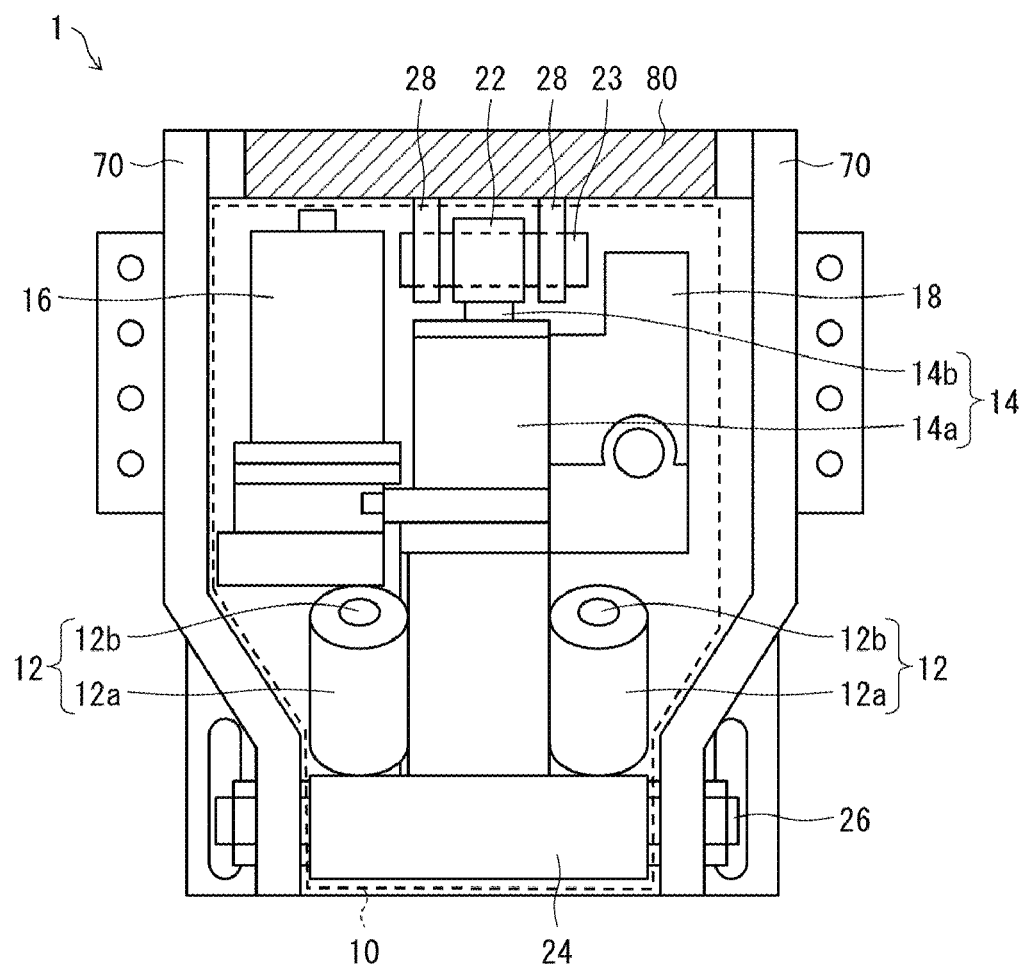
FIG. 2 is a front view illustrating one example of a configuration of the outboard motor raising and lowering apparatus in accordance with Embodiment 1.
Figure 3:
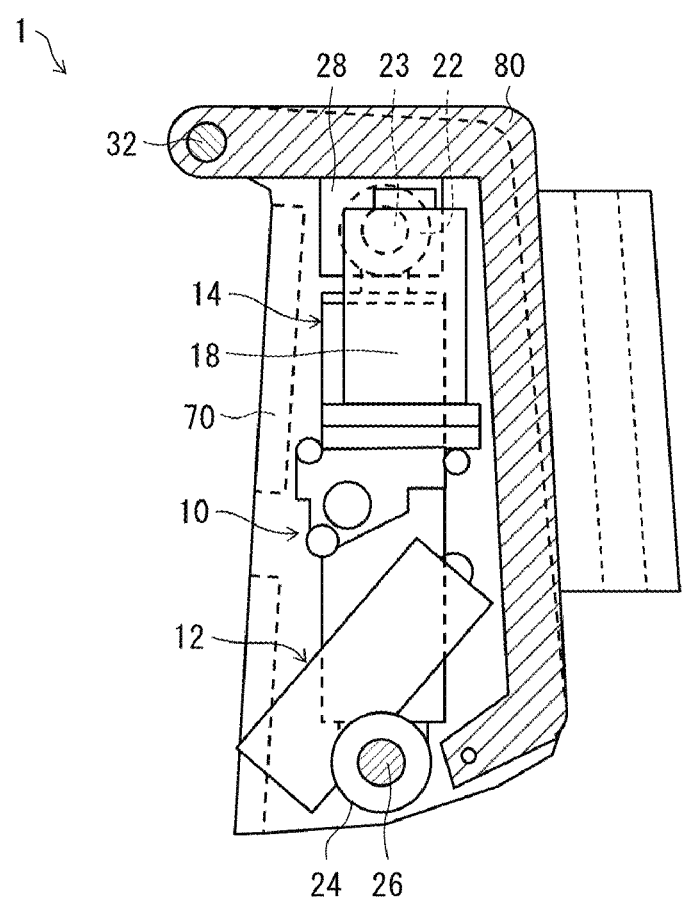
FIG. 3 is a lateral cross-sectional view of the outboard motor raising and lowering apparatus in accordance with Embodiment 1.

FIG. 2 is a front view illustrating one example of a configuration of the outboard motor raising and lowering apparatus 1, and FIG. 3 is a lateral cross-sectional view of the outboard motor raising and lowering apparatus 1. As illustrated in FIG. 2, the outboard motor raising and lowering apparatus 1 includes: a cylinder unit 10; a pair of stern brackets 70 for attachment to the stern of the hull 200; and a swivel bracket 80 for attachment to the outboard motor 300.

The cylinder unit 10 includes, for example: two trim cylinders 12, one tilt cylinder 14, a motor 16, a tank 18, an upper joint 22, and a base 24, as illustrated in FIG. 2. The trim cylinders 12 and the tilt cylinder 14 are provided such that they cannot move relative to the base 24.

Note that the number of the trim and tilt cylinders 12 and 14 included in the cylinder unit 10 is not intended to limit Embodiment 1, and that Embodiment 1 encompasses any cylinder unit 10 that includes one or more trim cylinders 12 and one or more tilt cylinders 14. The following explanation holds also for such a cylinder unit 10 that includes one or more trim cylinders 12 and one or more tilt cylinders 14.

The trim cylinders 12 each include: a cylinder barrel 12a; a piston 12c (see FIG. 4) slidably disposed within the cylinder barrel 12a; and a piston rod 12b secured to the piston 12c. The tilt cylinder 14 includes: a cylinder barrel 14a; a piston 14c (see FIG. 4) slidably disposed within the cylinder barrel 14a; and a piston rod 14b secured to the piston 14c.

Furthermore, as illustrated in FIG. 2, the base 24 and the stern brackets 70 each have a through-hole. The base 24 and the stern brackets 70 are connected to each other via a lower shaft 26 passing through these through-holes such that the base 24 and the stern brackets 70 can rotate relative to each other.

Furthermore, as illustrated in FIG. 2, the upper joint 22 is provided at the tip of the piston rod 14b, and the swivel bracket 80 has supporting members 28 secured thereto. The upper joint 22 and the supporting members 28 each have a through-hole, and the upper joint 22 and the swivel bracket 80 are connected to each other via an upper shaft 23 passing through these through-holes such that the upper joint 22 and the swivel bracket 80 can rotate relative to each other.

Moreover, the stern brackets 70 and the swivel bracket 80 each have a through-hole at one end of an upper portion thereof, and, as illustrated in FIG. 3, the stern brackets 70 and the swivel bracket 80 are connected to each other via a support shaft 32 passing through these through-holes such that the stern brackets 70 and the swivel bracket 80 can rotate relative to each other.

(Trim Range and Tilt Range)

The ascending or descending motion of the piston rod 14b of the tilt cylinder 14 raises or lowers the swivel bracket 80, resulting in raising or lowering of the outboard motor 300.

By means of the ascending and descending motions of the piston rod 14b of the tilt cylinder 14, the angle of the outboard motor 300 is adjusted within an angle range, which is composed of a trim range and a tilt range illustrated in (a) of FIG. 1. The tilt range is an angle range such that, when the angle of the outboard motor 300 is within this range, the tips of the piston rods 12b of the trim cylinders 12 cannot abut the swivel bracket 80. The angle of the outboard motor 300 in the tilt range is adjusted using the piston rod 14b of the tilt cylinder 14.

On the other hand, the trim range is an angle range such that, when the angle of the outboard motor 300 is within this range, the tips of the piston rods 12b of the trim cylinders 12 can abut the swivel bracket 80. The angle of the outboard motor 300 in the trim range can be adjusted using both the piston rods 12b of the trim cylinders 12 and the piston rod 14b of the tilt cylinder 14. It should be noted however that, in Embodiment 1, the angle of the outboard motor 300 is adjusted using only the piston rod 14b of the tilt cylinder 14 also in the tilt range, in some cases (these cases will be described later).

(Hydraulic Circuit)

Figure 4:
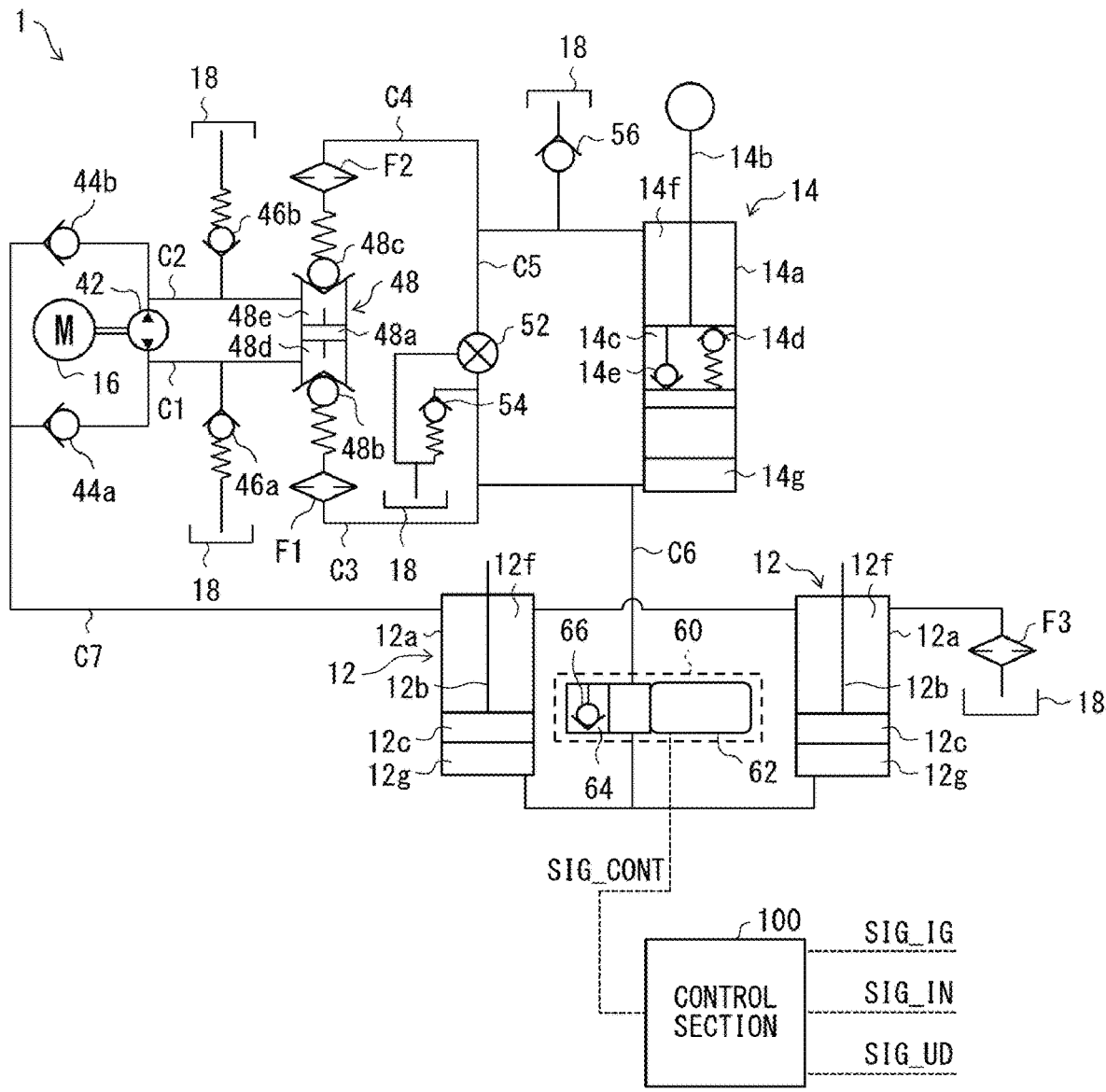
FIG. 4 illustrates a hydraulic circuit of the outboard motor raising and lowering apparatus in accordance with Embodiment 1 along with a control section.

The following description will discuss a hydraulic circuit of the outboard motor raising and lowering apparatus 1. FIG. 4 illustrates the hydraulic circuit of the outboard motor raising and lowering apparatus 1 along with a control section 100. In FIG. 4, the members that have already been discussed are assigned the same referential numerals.

As illustrated in FIG. 4, the outboard motor raising and lowering apparatus 1 includes: the motor 16; a pump 42; a first non-return valve 44a; a second non-return valve 44b; an up blow valve 46a; a down blow valve 46b; a main valve 48; a manual valve 52; a thermal valve 54; the tilt cylinder 14; the trim cylinders 12; the tank 18; filters F1 to F3; first to seventh flow passages C1 to C7; and the control section 100.

The pump 42, which is driven by the motor 16 and which serves as a hydraulic pressure source, carries out a "forward rotation", "reverse rotation", or "stop" action in response to a UP or DOWN signal SIG_UD, which is indicative of an instruction provided by an operator to raise or lower the outboard motor. The tank 18 stores a hydraulic fluid therein.

As illustrated in FIG. 4, the main valve 48 includes a spool 48a, a first check valve 48b, and a second check valve 48c. The main valve 48 is partitioned by the spool 48a into: a first shuttle chamber 48d nearer the first check valve 48b; and a second shuttle chamber 48e nearer the second check valve 48c.

The first flow passage C1 connects the pump 42 and the first shuttle chamber 48d, and connects the pump 42 and the first non-return valve 44a. The first flow passage C1 is also connected with the up blow valve 46a. The second flow passage C2 connects the pump 42 and the second shuttle chamber 48e, and connects the pump 42 and the second non-return valve 44b. The second flow passage C2 is also connected with the down blow valve 46b.

The tilt cylinder 14 is partitioned by the piston 14c into an upper chamber 14f and a lower chamber 14g. The piston 14c of the tilt cylinder 14 includes, as illustrated in FIG. 4, a shock blow valve 14d and a return valve 14e.

Each of the trim cylinders 12 is partitioned by the piston 12c into an upper chamber 12f and a lower chamber 12g.

The first check valve 48b is connected to the lower chamber 14g of the tilt cylinder 14 via the filter F1 and the third flow passage C3. On the other hand, the second check valve 48c is connected to the upper chamber 14f of the tilt cylinder 14 via the filter F2 and the fourth flow passage C4. As illustrated in FIG. 4, the fourth flow passage C4 is connected with an upper chamber feed valve 56.

The fifth flow passage C5, which connects the third flow passage C3 and the fourth flow passage C4, has the manual valve 52 and the thermal valve 54 connected thereto.

Note that the first flow passage C1 and the third flow passage C3, which connect the pump 42 and the lower chamber 14g of the tilt cylinder 14 via the main valve 48 and the filter F1, may be collectively referred to as a first fluid passage.

The sixth flow passage C6 (this may also be referred to as a second fluid passage) connects the third flow passage C3 and the lower chambers 12g of the trim cylinders 12. The sixth flow passage C6 is provided with a switching valve 60.

The seventh flow passage C7 connects the first non-return valve 44a, the second non-return valve 44b, and the upper chambers 12f of the trim cylinders 12 together, and is connected to the tank 18 via the filter F3.

The first non-return valve 44a allows supply of hydraulic fluid from the tank 18 to the pump 42 when the pump 42 still tries to take in hydraulic fluid even under the conditions in which the trim cylinders 12 and the tilt cylinder 14 have fully retracted.

The second non-return valve 44b allows supply of hydraulic fluid in an amount corresponding to the volume that used to be occupied by the piston rod 14b from the tank 18 to the pump 42 when the tilt cylinder 14 extends, and allows supply of hydraulic fluid in an amount corresponding to the volume that used to be occupied by the piston rods 12b from the tank 18 to the pump 42 when the trim cylinders 12 extend.

The up blow valve 46a allows return of excess hydraulic fluid to the tank 18 when the pump 42 still continues to deliver hydraulic fluid even under the conditions in which the trim cylinders 12 and the tilt cylinder 14 have fully extended.

The down blow valve 46b allows return of hydraulic fluid in an amount corresponding to the volume displaced by the piston rod 14b to the tank 18 when the tilt cylinder 14 retracts, and allows return of hydraulic fluid in an amount corresponding to the volume displaced by the piston rods 12b to the tank 18 when the trim cylinders 12 retract.

The manual valve 52 can be manually opened and closed. When the manual valve 52 is placed into its open state for maintenance of the outboard motor raising and lowering apparatus 1 or the like, hydraulic fluid returns from the lower chamber 14g of the tilt cylinder 14 to the tank 18. This makes it possible to manually cause the tilt cylinder 14 to retract.

The thermal valve 54 allows return of excess hydraulic fluid to the tank 18 when the volume of hydraulic fluid increases due to temperature rise.

(Switching Valve 60)

The switching valve 60 at the sixth flow passage C6 includes, as illustrated in FIG. 4: a solenoid 62; and a plunger 64 that is driven by the solenoid 62 and that serves to place the sixth flow passage C6 into a blocked state or an open state. The solenoid 62 is supplied with a control signal SIG_CONT from the control section 100 (described later), and is turned on or off in accordance with the control signal SIG_CONT.

The switching valve 60 may be a normally closed valve such that: when the solenoid 62 is off, the switching valve 60 is in the closed state so that the sixth flow passage C6 is blocked; and, when the solenoid 62 is on, the switching valve 60 is in the open state so that the sixth flow passage C6 is opened. Alternatively, the switching valve 60 may be a normally open valve such that: when the solenoid is off, the switching valve 60 is in the open state so that the sixth flow passage C6 is opened; and, when the solenoid is on, the switching valve 60 is in the closed state so that the sixth flow passage C6 is blocked.

In cases where the switching valve 60 is a normally open valve, the sixth flow passage C6 is kept open (that is, the lower chambers 12g of the trim cylinders 12 and the lower chamber 14g of the tilt cylinder 14 are kept in communication with each other) even if the switching valve 60 stops operating. Thus, the angle of the outboard motor 300 can be adjusted using both the tilt cylinder 14 and the trim cylinders 12.

On the other hand, in cases where the switching valve 60 is a normally closed valve, the sixth flow passage C6 is kept closed (that is, the lower chambers 12g of the trim cylinders 12 and the lower chamber 14g of the tilt cylinder 14 are kept isolated from each other) even if the switching valve 60 stops operating. This prevents hydraulic fluid from overflowing from the lower chamber 14g of the tilt cylinder 14. Thus, the angle of the outboard motor 300 can be adjusted or kept using only the tilt cylinder 14.

Note that, in Embodiment 1, the plunger 64 is provided with a trim lower chamber protective valve 66, which serves to prevent the hydraulic pressure in the lower chambers 12g of the trim cylinders 12 from becoming too high when the sixth flow passage C6 is in the blocked state.

(Control Section 100)

As illustrated in FIG. 4, the outboard motor raising and lowering apparatus 1 includes the control section 100. The control section 100 generates the control signal SIG_CONT to control the switching valve 60, with reference to: an ignition signal SIG_IG indicative of whether an ignition of the hull 200 is on or off; a watercraft status signal SIG_IN; and a UP or DOWN signal SIG_UD indicative of an instruction provided by an operator to raise or lower the outboard motor 300. The generated control signal SIG_CONT is supplied to the switching valve 60. Note that the watercraft status signal SIG_IN is, for example, a status signal indicative of the status of the outboard motor 300; however, embodiments described in this specification are not limited as such. Various examples of a watercraft status signal will be described later.

The outboard motor raising and lowering apparatus 1, which includes the control section 100, is capable of automatically changing the speed of raising/lowering the outboard motor 300 according to the status of the outboard motor 300.

(Example Configuration of Control Section 100)

The following description will discuss a specific example configuration of the control section 100 with reference to a different drawing.

Figures 5, 6:
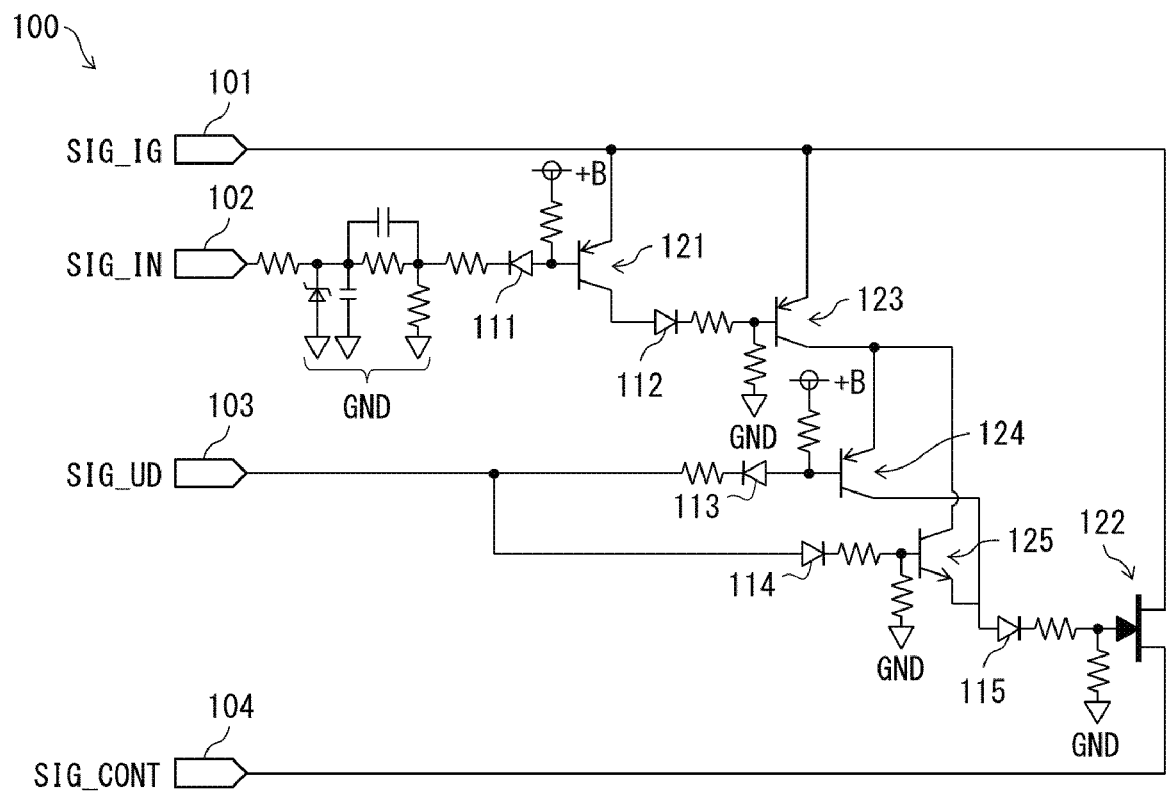
FIG. 5 is a circuit diagram illustrating one example configuration of the control section in accordance with Embodiment 1.
FIG. 6 shows one example of how a switching valve is controlled by the control section in accordance with Embodiment 1.

FIG. 5 is a circuit diagram illustrating one example configuration of the control section 100. In this example, the ignition signal SIG_IG, the watercraft status signal SIG_IN, and the UP or DOWN signal SIG_UD, which are input to the control section 100, are all analog signals.

As illustrated in FIG. 5, the control section 100 in accordance with this example includes: first to fourth connectors 101 to 104; first to fifth switching elements 121 to 125; and the like. In this example, the first switching element 121, the third switching element 123, and the fourth switching element 124 are each constituted by, for example, a transistor, whereas the second switching element is constituted by, for example, a field-effect transistor (FET).

The collector electrode of the first switching element 121, the collector electrode of the third switching element 123, and the drain electrode of the second switching element 122 receive the ignition signal SIG_IG via the first connector 101.

The base electrode of the first switching element 121 receives the watercraft status signal SIG_IN via the second connector 102 and a diode 111, and the base electrode of the third switching element 123 receives emitter current from the first switching element 121 via a diode 112. The base electrode of the fourth switching element 124 receives the UP or DOWN signal SIG_UD via the third connector 103 and a diode 113, and the base electrode of the fifth switching element 125 receives the UP or DOWN signal SIG_UD via the third connector 103 and a diode 114.

The gate electrode of the second switching element 122 receives a signal corresponding to the emitter current from the first switching element 121 via the third switching element 123 and the fourth switching element or via the third switching element 123 and the fifth switching element. More specifically, the gate electrode of the second switching element 122 receives, via a diode 115, emitter current from the fourth switching element 124 and emitter current from the fifth switching element 125.

From the source electrode of the second switching element 122, the control signal SIG_CONT is supplied to the switching valve 60 via the fourth connector 104.

(Specific Example of Watercraft Status Signal SIG_IN)

The foregoing watercraft status signal SIG_IN is, for example, an engine signal indicative of the status of the engine 301 of the outboard motor 300. As used herein, the engine signal refers to, for example, a signal indicative of the revolutions per minute (RPM) of the engine 301, and can be obtained from, for example, the engine 301. Note that, when the RPM of the engine is zero, the engine is off, whereas, when the RPM of the engine is not zero, the engine is on. As such, the signal indicative of the RPM of the engine can also be regarded as a signal indicative of whether the engine is on or off.

In cases where an engine signal is employed as the watercraft status signal SIG_IN, the outboard motor raising and lowering apparatus 1 is capable of automatically changing the speed of raising/lowering of the outboard motor 300 according to the status of the engine 301 of the outboard motor 300, as described later.

Another example of the watercraft status signal SIG_IN is a gear signal that is indicative of whether or not the power transmission mechanism 302 of the outboard motor 300 is in a state that allows power transmission, that is, whether or not the power transmission mechanism 302 is in an "in-gear" state. The gear signal can be obtained from, for example, the power transmission mechanism 302.

In cases where a gear signal is employed as the watercraft status signal SIG_IN, the outboard motor raising and lowering apparatus 1 is capable of automatically changing the speed of raising/lowering of the outboard motor 300 according to the status of the power transmission mechanism 302 of the outboard motor 300, as described later.

Note that the foregoing engine signal and in-gear signal are examples of the status signal indicative of the status of the outboard motor 300.

(Examples of Action Carried Out by Outboard Motor Raising and Lowering Apparatus 1)

(Raising Action)

When the UP or DOWN signal SIG_UD is indicative of "UP", the pump 42 rotates in a forward direction, and thereby pressurized hydraulic fluid is delivered from the pump 42 to the first shuttle chamber 48d of the main valve 48. With this, the first check valve 48b opens, the spool 48a moves toward the first check valve 48b, and the second check valve 48c opens. It follows that the hydraulic fluid is supplied to the lower chamber 14g of the tilt cylinder 14 and that the hydraulic fluid is withdrawn from the upper chamber 14f of the tilt cylinder 14.

In the above case, when the switching valve 60 is in the open state, the hydraulic fluid is supplied also to the lower chambers 12g of the trim cylinders 12, and thereby both the piston rod 14b of the tilt cylinder 14 and the piston rods 12b of the trim cylinders 12 ascend.

On the other hand, when the switching valve 60 is in the closed state, the hydraulic fluid is not supplied to the lower chambers 12g of the trim cylinders 12. Therefore, although the piston rod 14b of the tilt cylinder 14 ascends, the piston rods 12b of the trim cylinders 12 do not ascend.

When the switching valve 60 is in the closed state, the hydraulic fluid is not supplied to the lower chambers 12g of the trim cylinders 12. The amount of hydraulic fluid delivered by the pump 42 per unit time is not significantly different between when the switching valve 60 is in the open state and when the switching valve 60 is in the closed state. Thus, the piston rod 14b of the tilt cylinder 14 ascends more quickly than when the switching valve 60 is in the open state.

(Lowering Action)

When the UP or DOWN signal SIG_UD is indicative of "DOWN", the pump 42 rotates in a reverse direction, and thereby pressurized hydraulic fluid is delivered from the pump 42 to the second shuttle chamber 48e of the main valve 48. With this, the second check valve 48c opens, the spool 48a moves toward the second check valve 48c, and the first check valve 48b opens. It follows that the hydraulic fluid is supplied to the upper chamber 14f of the tilt cylinder 14 and that the hydraulic fluid is withdrawn from the lower chamber 14g of the tilt cylinder 14.

In the above case, when the switching valve 60 is in the open state, the hydraulic fluid is withdrawn also from the lower chambers 12g of the trim cylinders 12, and thereby both the piston rod 14b of the tilt cylinder 14 and the piston rods 12b of the trim cylinders 12 descend.

On the other hand, when the switching valve 60 is in the closed state, the hydraulic fluid is not withdrawn from the lower chambers 12g of the trim cylinders 12. Therefore, although the piston rod 14b of the tilt cylinder 14 descends, the piston rods 12b of the trim cylinders 12 do not descend.

When the switching valve 60 is in the closed state, the hydraulic fluid is not withdrawn from the lower chambers 12g of the trim cylinders 12. Thus, the piston rod 14b of the tilt cylinder 14 descends more quickly than when the switching valve 60 is in the open state.

(Hold State)

When the UP or DOWN signal SIG_UD is indicative of neither "UP" nor "DOWN", the pump 42 stops. The stoppage of the pump 42 results in holding of the outboard motor 300 by the outboard motor raising and lowering apparatus 1, in which the flow of hydraulic fluid within the hydraulic circuit of the outboard motor raising and lowering apparatus 1 has spontaneously ceased. Note that, in this specification, the case in which the UP or DOWN signal SIG_UD is indicative of neither "UP" nor "DOWN" may be referred to as "the UP or DOWN signal SIG_UD is indicative of 'HOLD'", for convenience of description.

(Example of how to Control Switching Valve 60)

The following description will discuss an example of how the switching valve 60 is controlled by the control section 100, with reference to FIG. 6.

FIG. 6 is a table showing examples of: the status of the outboard motor 300 indicated by the watercraft status signal SIG_IN; an instruction which is provided by an operator to raise or lower the outboard motor 300 and which is indicated by the UP or DOWN signal SIG_UD; and the state into which the switching valve 60 is placed by the control section 100.

In the examples shown in FIG. 6, when the watercraft status signal SIG_IN is indicative of "engine is on" or "in-gear", the control section 100 places the switching valve 60 into the open state regardless of which of the "UP", "DOWN", and "HOLD" options is indicated by the UP or DOWN signal SIG_UD.

Thus, when the engine 301 is on or the power transmission mechanism 302 is in the "in-gear" state, both the piston rod 14b of the tilt cylinder 14 and the piston rods 12b of the trim cylinders 12 ascend or descend, and thereby the angle of the outboard motor 300 is adjusted, in the trim range. Furthermore, even if the internal pressure of the lower chambers 12g of the trim cylinders 12 increases due to some external force while the outboard motor 300 is in a held state, the pressure is distributed to the lower chamber 14g of the tilt cylinder.

On the other hand, in the examples shown in FIG. 6, when the watercraft status signal SIG_IN is indicative of "engine is off" or "out-of-gear" and the UP or DOWN signal SIG_UD is indicative of "UP" or "HOLD", the control section 100 places the switching valve 60 into the closed state.

Thus, when the outboard motor 300 is to be raised while the engine 301 is off or the power transmission mechanism 302 is in the "out-of-gear" state, only the piston rod 14b of the tilt cylinder 14 ascends, also in the trim range. Accordingly, when the engine 301 is off or the power transmission mechanism 302 is in the "out-of-gear" state, the outboard motor 300 can be raised more quickly than when the engine 301 is off or the power transmission mechanism 302 is in the "in-gear" state.

Furthermore, since the hydraulic fluid is not supplied from the lower chamber 14g of the tilt cylinder 14 to the lower chambers 12g of the trim cylinders 12 while the outboard motor 300 is in the held state, the outboard motor 300 can be securely held by the piston rod 14b of the tilt cylinder 14.

In the examples shown in FIG. 6, when the watercraft status signal SIG_IN is indicative of "engine is off" or "out-of-gear" and the UP or DOWN signal SIG_UD is indicative of "DOWN", the control section 100 places the switching valve 60 into the open state.

Thus, when the outboard motor 300 is to be lowered while the engine 301 is off or the power transmission mechanism 302 is in the "out-of-gear" state, the hydraulic fluid is supplied from the lower chamber 14g of the tilt cylinder 14 to the lower chambers 12g of the trim cylinders 12, and thereby the piston rods 12b of the trim cylinders 12 ascend to abut the swivel bracket 80.

Note that how to control the switching valve 60 is not limited to the foregoing examples, and can be changed appropriately in consideration of user friendliness, adaptability of the outboard motor raising and lowering apparatus 1 to external forces, and the like.

For example, the following arrangement may be employed: when the watercraft status signal SIG_IN is indicative of "engine is off" or "out-of-gear" and the UP or DOWN signal SIG_UD is indicative of "DOWN", the control section 100 places the switching valve 60 into the closed state.

In this arrangement, when the outboard motor 300 is to be lowered while the engine 301 is off or the power transmission mechanism 302 is in the "out-of-gear" state, the hydraulic fluid is not supplied from the lower chamber 14g of the tilt cylinder 14 to the lower chambers 12g of the trim cylinders 12. Thus, the outboard motor 300 can be lowered more quickly than when the engine 301 is on or the power transmission mechanism 302 is in the "in-gear" state.

Embodiment 2

Figure 7:
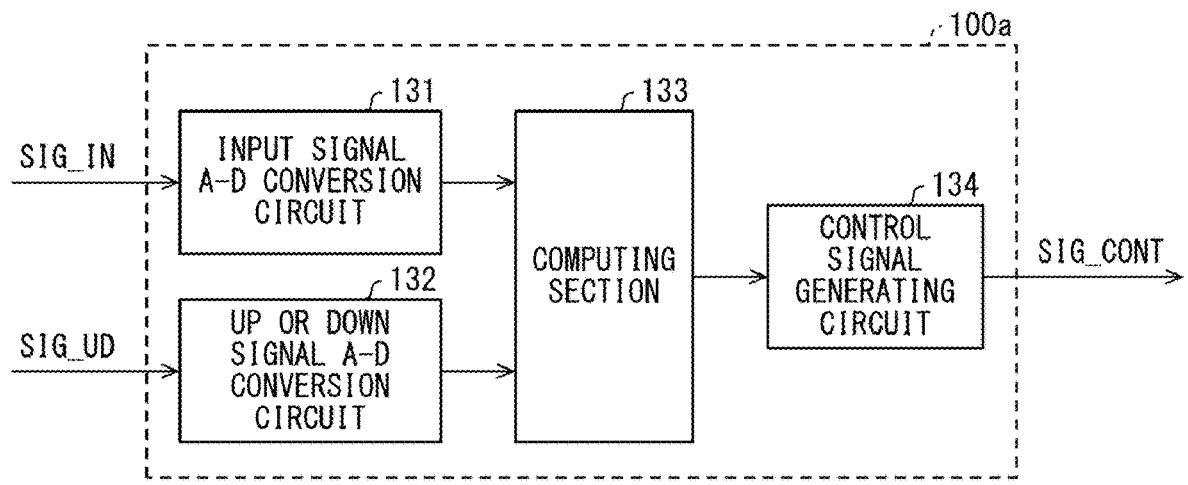
FIG. 7 is a block diagram illustrating a configuration of a control section in accordance with Embodiment 2.

The following description will discuss a control section 100a in accordance with Embodiment 2 with reference to FIG. 7. FIG. 7 is a block diagram illustrating a configuration of the control section 100a in accordance with Embodiment 2.

An outboard motor raising and lowering apparatus in accordance with Embodiment 2 is different from the outboard motor raising and lowering apparatus 1 in accordance with Embodiment 1 in that the outboard motor raising and lowering apparatus in accordance with Embodiment 2 includes the control section 100a illustrated in FIG. 7 in place of the control section 100. The rest of the features of the outboard motor raising and lowering apparatus in accordance with Embodiment 2 are the same as those of the outboard motor raising and lowering apparatus 1 discussed in Embodiment 1.

The control section 100a includes: a watercraft status signal A-D conversion circuit 131; a UP or DOWN signal A-D conversion circuit 132; a computing section 133; and a control signal generating circuit 134. Also in Embodiment 2, a watercraft status signal SIG_IN and a UP or DOWN signal SIG_UD, which are input to the control section 100a, are analog signals. Note that, in FIG. 7, the watercraft status signal A-D conversion circuit 131 is represented as "input signal A-D conversion circuit 131".

The watercraft status signal A-D conversion circuit 131 is a conversion circuit that serves to convert the watercraft status signal SIG_IN into a digital form. The watercraft status signal SIG_IN, which has been converted into a digital form, is supplied to the computing section 143.

The UP or DOWN signal A-D conversion circuit 132 is a conversion circuit that serves to convert the UP or DOWN signal SIG_UD into a digital form. The UP or DOWN signal SIG_UD, which has been converted into a digital form, is supplied to the computing section 143.

The computing section 133 determines into which of the open and closed states the switching valve 60 is to be placed, with reference to the watercraft status signal SIG_IN and UP or DOWN signal SIG_UD in digital form. A signal indicative of the result of the determination is supplied to the control signal generating circuit 134.

The control signal generating circuit 134 generates a control signal SIG_CONT corresponding to the result of the determination, with reference to the signal indicative of the result of the determination. The generated control signal SIG_CONT is supplied to the switching valve 60.

How the computing section 133 determines the state into which the switching valve 60 is to be placed, in relation to the watercraft status signal SIG_IN and the UP or DOWN signal SIG_UD, does not impose any limitation on Embodiment 2. For example, the determination can be carried out in the same manner as shown in FIG. 6 of Embodiment 1.

The outboard motor raising and lowering apparatus in accordance with Embodiment 2, which includes the control section 100a, is capable of automatically changing the speed of raising/lowering of the outboard motor, as with Embodiment 1. Furthermore, in cases where a status signal indicative of the status of the outboard motor 300 is employed as the watercraft status signal SIG_IN, the outboard motor raising and lowering apparatus is capable of automatically changing the speed of raising/lowering of the outboard motor 300 according to the status of the outboard motor 300.

Embodiment 3

Figure 8:
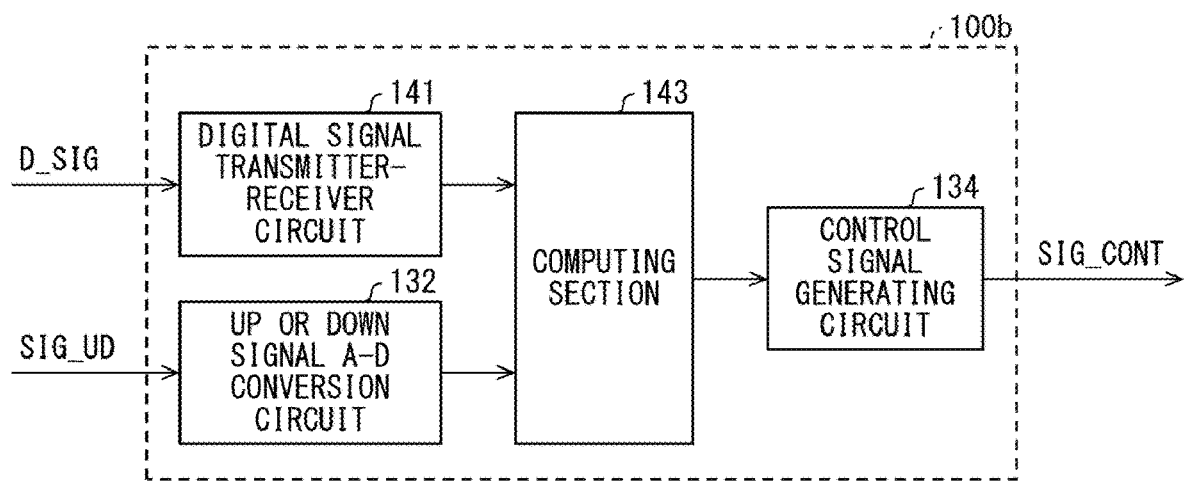
FIG. 8 is a block diagram illustrating a configuration of a control section in accordance with Embodiment 3.

The following description will discuss a control section 100b in accordance with Embodiment 3 with reference to FIG. 8. FIG. 8 is a block diagram illustrating a configuration of the control section 100b in accordance with Embodiment 3.

An outboard motor raising and lowering apparatus in accordance with Embodiment 3 is different from the outboard motor raising and lowering apparatus 1 in accordance with Embodiment 1 in that the outboard motor raising and lowering apparatus in accordance with Embodiment 3 includes the control section 100b illustrated in FIG. 8 in place of the control section 100. In the following description, members which are the same as those already discussed are assigned the same referential numerals, and their descriptions are omitted.

As illustrated in FIG. 8, the control section 100b includes: a digital signal transmitter-receiver circuit 141; a UP or DOWN signal A-D conversion circuit 132; a computing section 143; and a control signal generating circuit 134.

The digital signal transmitter-receiver circuit 141 receives a digital signal D_SIG as a watercraft status signal, and supplies the received digital signal D_SIG to the computing section 143.

The digital signal D_SIG is a signal transmitted over a wired or wireless network on the hull 200, and contains input information INFO_IN. As used herein, the input information INFO_IN refers to information that is the same as the information indicated by the watercraft status signal SIG_IN as discussed in Embodiments 1 and 2. The input information INFO_IN may contain, for example, information equivalent to the status signal indicative of the status of the outboard motor 300 as discussed in Embodiments 1 and 2. Specific examples of the input information INFO_IN include: a single-bit flag indicative of whether the engine 301 is on or off; a single-bit flag indicative of whether or not the power transmission mechanism 302 of the outboard motor 300 is in the "in-gear" state; and the like.

The digital signal D_SIG can contain various kinds of information related to the hull 200 and various kinds of information obtained from some source outside the hull 200. A specific standard used to transmit the digital signal D_SIG does not impose any limitation on Embodiment 3, and is, for example, NMEA 2000 (registered trademark) set by the National Marine Electronics Association (NMEA).

The computing section 143 determines into which of the open and closed states the switching valve 60 is to be placed, with reference to the digital signal D_SIG supplied from the digital signal transmitter-receiver circuit 141 and the UP or DOWN signal SIG_UD in digital form supplied from the UP or DOWN signal A-D conversion circuit 132. A signal indicative of the result of the determination is supplied to the control signal generating circuit 134.

How the computing section 143 determines the state into which the switching valve 60 is to be placed, in relation to the input information INFO_IN and the UP or DOWN signal SIG_UD, does not impose any limitation on Embodiment 3. For example, the determination can be carried out in the same manner as shown in FIG. 6 of Embodiment 1.

The computing section 143 may be arranged to determine into which of the open and closed states the switching valve is to be placed with further reference to other information contained in the digital signal D_SIG.

The outboard motor raising and lowering apparatus in accordance with Embodiment 3, which includes the control section 100b, is capable of automatically changing the speed of raising/lowering of the outboard motor, as with Embodiment 1. Furthermore, in cases where an arrangement in which the digital signal D_SIG contains information equivalent to the status signal indicative of the status of the outboard motor 300 is employed, the outboard motor raising and lowering apparatus is capable of automatically changing the speed of raising/lowering of the outboard motor according to the status of the outboard motor.

Embodiment 4

The following description will discuss, as Embodiment 4, other specific examples of the watercraft status signal SIG_IN other than those described in Embodiments 1 and 2. The watercraft status signal SIG_IN can include one or more of the following other specific examples instead of or in addition to the specific examples described in Embodiments 1 and 2.

Note that, as described in Embodiment 3, the digital signal D_SIG in accordance with Embodiment 3 contains information equivalent to the information contained in the watercraft status signal SIG_IN. As such, in the following description, the matters related to the watercraft status signal SIG_IN apply not only to Embodiments 1 and 2 but also to the digital signal D_SIG in accordance with Embodiment 3.

Signals that can be included in the watercraft status signal SIG_IN are classified into:

(A) outboard motor performance signal obtainable from the outboard motor 300; and (B) hull (main part) performance signal obtainable from the hull (main part) 200.

The following are examples of the outboard motor performance signal obtainable from the outboard motor 300 and examples of how control is carried out by the control section 100, 100a, or 100b (hereinafter may be referred to as a control section for short) with reference to the outboard motor performance signal.

(A-1) Ignition Signal

An ignition signal is a signal indicative of whether an ignition of the outboard motor 300 is on or off.

The control section may be configured such that, for example: if the ignition is on, the control section controls the switching valve 60 in the same manner as in the case of "engine is on or in-gear" shown in FIG. 6; and, if the ignition is off, the control section controls the switching valve 60 in the same manner as in the case of "engine is off or out-of-gear" shown in FIG. 6.

(A-2) Tilting/Trimming Control Signal

A tilting/trimming control signal is a signal for controlling tilting and/or trimming of the outboard motor 300.

The control section places the switching valve 60 into the open or closed state in accordance with the tilting/trimming control signal.

(A-3) Engine Neutral Signal

An engine neutral signal is a signal indicative of whether or not the engine of the outboard motor 300 is in neutral.

The control section may be configured such that, for example: if the engine is not in neutral, the control section controls the switching valve 60 in the same manner as in the case of "engine is on or in-gear" shown in FIG. 6; and, if the engine is in neutral, the control section controls the switching valve 60 in the same manner as in the case of "engine is off or out-of-gear" shown in FIG. 6.

(A-4) Trim Angle Signal

A trim angle signal is a signal indicative of the trim angle of the outboard motor 300.

The control section may be configured such that, for example: if the trim angle of the outboard motor 300 is less than a specified value, the control section controls the switching valve 60 in the same manner as in the case of "engine is on or in-gear" shown in FIG. 6; and, if the trim angle of the outboard motor 300 is equal to or greater than the specified value, the control section controls the switching valve 60 in the same manner as in the case of "engine is off or out-of-gear" shown in FIG. 6.

(A-5) Engine Water Temperature Signal

An engine water temperature signal is a signal indicative of the water temperature of the engine of the outboard motor 300.

The control section may be configured such that, for example: if the water temperature of the engine is equal to or higher than a specified value, the control section controls the switching valve 60 in the same manner as in the case of "engine is on or in-gear" shown in FIG. 6; and, if the water temperature of the engine is lower than the specified value, the control section controls the switching valve 60 in the same manner as in the case of "engine is off or out-of-gear" shown in FIG. 6.

(A-6) Engine Oil Temperature Signal

An engine water temperature signal is a signal indicative of the oil temperature of the engine of the outboard motor 300.

The control section may be configured such that, for example: if the oil temperature of the engine is equal to or higher than a specified value, the control section controls the switching valve 60 in the same manner as in the case of "engine is on or in-gear" shown in FIG. 6; and, if the oil temperature of the engine is lower than the specified value, the control section controls the switching valve 60 in the same manner as in the case of "engine is off or out-of-gear" shown in FIG. 6.

(A-7) Engine Hydraulic Pressure Signal

An engine hydraulic pressure signal is a signal indicative of the hydraulic pressure on the engine of the outboard motor 300.

The control section may be configured such that, for example: if the hydraulic pressure on the engine is equal to or higher than a specified value, the control section controls the switching valve 60 in the same manner as in the case of "engine is on or in-gear" shown in FIG. 6; and, if the oil temperature of the engine is lower than the specified value, the control section controls the switching valve 60 in the same manner as in the case of "engine is off or out-of-gear" shown in FIG. 6.

(A-8) Water Level Signal

A water level signal is a signal indicative of the water level with respect to the outboard motor 300.

The control section places the switching valve 60 into the open or closed state in accordance with the water level signal. The control section may be configured such that, for example: if the water level indicated by the water level signal is equal to or greater than a specified value, the control section controls the switching valve 60 in the same manner as in the case of "engine is on or in-gear" shown in FIG. 6; and, if the water level indicated by the water level signal is less than the specified value, the control section controls the switching valve 60 in the same manner as in the case of "engine is off or out-of-gear" shown in FIG. 6.

(A-9) Degree-of-Throttle-Opening Signal

A degree-of-throttle-opening signal is a signal indicative of the degree of opening of a throttle in the engine of the outboard motor 300.

The control section may be configured such that, for example: if the degree of opening of the throttle is equal to or greater than a specified value, the control section controls the switching valve 60 in the same manner as in the case of "engine is on or in-gear" shown in FIG. 6; and, if the degree of opening of the throttle is less than the specified value, the control section controls the switching valve 60 in the same manner as in the case of "engine is off or out-of-gear" shown in FIG. 6.

(A-10) Watercraft Speed Signal (Water Stream Signal)

A watercraft speed signal is a signal indicative of watercraft speed. Since the watercraft speed is determined with reference to the speed of water stream, the watercraft speed signal may be referred to as a water stream signal.

The control section may be configured such that: if the watercraft speed is equal to or greater than a specified value, the control section controls the switching valve 60 in the same manner as in the case of "engine is on or in-gear" shown in FIG. 6; and, if the watercraft speed is less than the specified value, the control section controls the switching valve 60 in the same manner as in the case of "engine is off or out-of-gear" shown in FIG. 6.

(A-11) Battery Voltage Signal

A battery voltage signal is a signal indicative of the voltage of a battery.

The control section places the switching valve 60 into the open or closed state in accordance with the voltage of a battery. The control section may be configured such that, for example: if the voltage of the battery is equal to or greater than a specified value, the control section controls the switching valve 60 in the same manner as in the case of "engine is on or in-gear" shown in FIG. 6; and, if the voltage of the battery is less than the specified value, the control section controls the switching valve 60 in the same manner as in the case of "engine is off or out-of-gear" shown in FIG. 6.

(A-12) Atmospheric Pressure Signal

An atmospheric pressure signal is a signal indicative of the value of atmospheric pressure. The control section places the switching valve 60 into the open or closed state depending on the value of atmospheric pressure.

Note that, among the foregoing examples of signals, the signals (A-1) to (A-11) can each be regarded as a status signal indicative of the status of the outboard motor 300.

Next, the following are examples of the hull (main part) performance signal obtainable from the hull 200 and examples of how control is carried out by the control section with reference to the hull (main part) performance signal.

(B-1) Impact Signal

An impact signal is a signal indicative of the amount of impact experienced by the hull 200.

The control section places the switching valve 60 into the open or closed state in accordance with the impact signal. More specifically, the control section places the switching valve 60 into the open or closed state depending on the amount of impact experienced by the hull 200 or depending on the presence or absence of the impact signal. The control section may be configured such that, for example: if the amount of impact is equal to or greater than a specified value, the control section controls the switching valve 60 in the same manner as in the case of "engine is on or in-gear" shown in FIG. 6; and, if the amount of impact is less than the specified value or the impact signal is absent, the control section controls the switching valve 60 in the same manner as in the case of "engine is off or out-of-gear" shown in FIG. 6.

(B-2) Heading Signal

A heading signal is a signal indicative of the travelling direction of the hull 200. The control section places the switching valve 60 into the open or closed state in accordance with the heading signal.

(B-3) Sonar Signal

A sonar signal is a signal supplied from sonar provided to the hull 200.

The control section places the switching valve 60 into the open or closed state in accordance with the sonar signal. More specifically, the control section places the switching valve 60 into the open or closed state depending on the presence or absence of an obstacle indicated by the sonar signal or depending on the presence or absence of the sonar signal. The control section may be configured such that, for example: if there is an obstacle, the control section controls the switching valve 60 in the same manner as in the case of "engine is on or in-gear" shown in FIG. 6; and, if there is no obstacle or the sonar signal is absent, the control section controls the switching valve 60 in the same manner as in the case of "engine is off or out-of-gear" shown in FIG. 6.

(B-4) GPS Signal

A GPS signal is a signal supplied from a global positioning system (GPS) device provided to the hull 200. Note that the GPS device may be provided on or near the hull.

The control section may be configured such that: if the watercraft speed indicated by the GPS signal is equal to or greater than a specified value, the control section controls the switching valve 60 in the same manner as in the case of "engine is on or in-gear" shown in FIG. 6; and, if the watercraft speed indicated by the GPS signal is less than the specified value, the control section controls the switching valve 60 in the same manner as in the case of "engine is off or out-of-gear" shown in FIG. 6.

(B-5) Transom Vibration Signal

A transom vibration signal is a signal indicative of the level of vibration of a transom of the hull 200.

The control section places the switching valve 60 into the open or closed state in accordance with the transom vibration signal. More specifically, the control section places the switching valve 60 into the open or closed state depending on the level of vibration indicated by the transom vibration signal or depending on the presence or absence of the transom vibration signal. The control section may be configured such that, for example: if the level of the vibration of the transom is equal to or greater than a specified value, the control section controls the switching valve 60 in the same manner as in the case of "engine is on or in-gear" shown in FIG. 6; and, if the level of the vibration of the transom is less than the specified value or the transom vibration signal is absent, the control section controls the switching valve 60 in the same manner as in the case of "engine is off or out-of-gear" shown in FIG. 6.

(B-6) Water Temperature Signal

A water temperature signal is a signal indicative of the temperature of water around the hull 200. The control section places the switching valve 60 into the open or closed state in accordance with the water temperature signal.

(B-7) Vibration Signal

A vibration signal is a signal indicative of the level of vibration of the hull 200.

The control section places the switching valve 60 into the open or closed state in accordance with the vibration signal. More specifically, the control section places the switching valve 60 into the open or closed state depending on the level of vibration indicated by the vibration signal or depending on the presence or absence of the vibration signal. The control section may be configured such that, for example: if the level of vibration indicated by the vibration signal is equal to or greater than a specified value, the control section controls the switching valve 60 in the same manner as in the case of "engine is on or in-gear" shown in FIG. 6; and, if the level of vibration indicated by the vibration signal is less than the specified value or the vibration signal is absent, the control section controls the switching valve 60 in the same manner as in the case of "engine is off or out-of-gear" shown in FIG. 6.

(B-8) IP Image Signal

An IP image signal is an image signal indicative of information about the surroundings of the hull 200.

The control section places the switching valve 60 into the open or closed state in accordance with the IP image signal. More specifically, the control section places the switching valve 60 into the open or closed state depending on the presence or absence of an obstacle indicated by the IP image signal or depending on the presence or absence of the IP image signal. The control section may be configured such that, for example: if there is an obstacle, the control section controls the switching valve 60 in the same manner as in the case of "engine is on or in-gear" shown in FIG. 6; and, if there is no obstacle or the IP image signal is absent, the control section controls the switching valve 60 in the same manner as in the case of "engine is off or out-of-gear" shown in FIG. 6.

(B-9) Radar Signal

A radar signal is supplied from radar provided to the hull 200.

The control section places the switching valve 60 into the open or closed state in accordance with the radar signal. More specifically, the control section places the switching valve 60 into the open or closed state depending on the presence or absence of an obstacle indicated by the radar signal or depending on the presence or absence of the radar signal. The control section may be configured such that, for example: if there is an obstacle, the control section controls the switching valve 60 in the same manner as in the case of "engine is on or in-gear" shown in FIG. 6; and, if there is no obstacle or the radar signal is absent, the control section controls the switching valve 60 in the same manner as in the case of "engine is off or out-of-gear" shown in FIG. 6.

(B-10) Sound Signal

A sound signal is a signal indicative of a watercraft operator (user)'s voice.

The control section places the switching valve 60 into the open or closed state in accordance with the sound signal. The control section may be configured to, for example, control the switching valve 60 in the same manner as shown in FIG. 6 with reference to a spoken command contained in the sound signal.

Note that, among the foregoing examples of signals, the signals (B-1) to (B-9) can each be regarded as a status signal indicative of the status of the hull (main part) 200.

[Software Implementation Example]

The control section (100, 100a, 100b) can be realized by a logic circuit (hardware) provided in an integrated circuit (IC chip) or the like or can be alternatively realized by software as executed by a central processing unit (CPU).

In the latter case, the control section (100, 100a, 100b) includes: a CPU that executes instructions of a program that is software realizing the foregoing functions; a read only memory (ROM) or a storage device (each referred to as "storage medium") in which the program and various kinds of data are stored so as to be readable by a computer (or a CPU); a random access memory (RAM) in which the program is loaded; and the like. An object of an embodiment of the present invention can be achieved by a computer (or a CPU) reading and executing the program stored in the storage medium. Examples of the storage medium encompass "a non-transitory tangible medium" such as a tape, a disk, a card, a semiconductor memory, and a programmable logic circuit. The program can be made available to the computer via any transmission medium (such as a communication network or a broadcast wave) which allows the program to be transmitted. Note that an embodiment of the present invention can also be achieved in the form of a computer data signal in which the program is embodied via electronic transmission and which is embedded in a carrier wave.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1 outboard motor raising and lowering apparatus
12 trim cylinder
14 tilt cylinder
42 pump (hydraulic pressure source)
60 switching valve
100, 100a, 100b control section
121 first switching element 122 second switching element
133, 143 computing section (determining section)
200 hull (main part)
300 outboard motor
301 engine
302 power transmission mechanism
303 propeller
C1 first flow passage (first fluid passage)
C2 second flow passage
C3 third flow passage (first fluid passage)
C4 fourth flow passage
C5 fifth flow passage
C6 sixth flow passage (second fluid passage)
C7 seventh flow passage

The invention claimed is:

1. An outboard motor raising and lowering apparatus configured to raise and lower an outboard motor, the outboard motor raising and lowering apparatus comprising:
one or more tilt cylinders;
one or more trim cylinders;
a hydraulic pressure source;
a first fluid passage that connects the hydraulic pressure source and one or more lower chambers of the respective one or more tilt cylinders;
a second fluid passage that connects the first fluid passage and one or more lower chambers of the respective one or more trim cylinders;
a switching valve provided at the second fluid passage; and
a control section configured to control the switching valve with reference to a watercraft status signal,
the watercraft status signal being an analog signal,
the control section including
a first switching element that includes a base electrode arranged to receive the watercraft status signal, and
a second switching element that includes (i) a gate electrode arranged to receive a signal corresponding to emitter current from the first switching element and (ii) a source electrode connected to the switching valve.

2. The outboard motor raising and lowering apparatus according to claim 1, wherein the watercraft status signal is an engine signal indicative of a status of an engine of the outboard motor.

3. The outboard motor raising and lowering apparatus according to claim 2, wherein the engine signal is a signal indicative of an RPM of the engine.

4. The outboard motor raising and lowering apparatus according to claim 2, wherein the control section is configured to place the switching valve into a closed state if the engine signal indicates that the engine is off.

5. The outboard motor raising and lowering apparatus according to claim 1, wherein the watercraft status signal is a signal indicative of whether or not a power transmission mechanism of the outboard motor is in a state that allows power transmission.

6. The outboard motor raising and lowering apparatus according to claim 5, wherein the control section is configured to place the switching valve into a closed state if the watercraft status signal indicates that the power transmission mechanism is not in the state that allows power transmission.

* * * * *